May 13, 1969   V. E. HENLEY   3,444,030
CONVEYER LENGTH ADJUSTMENT MECHANISM
Filed May 19, 1966
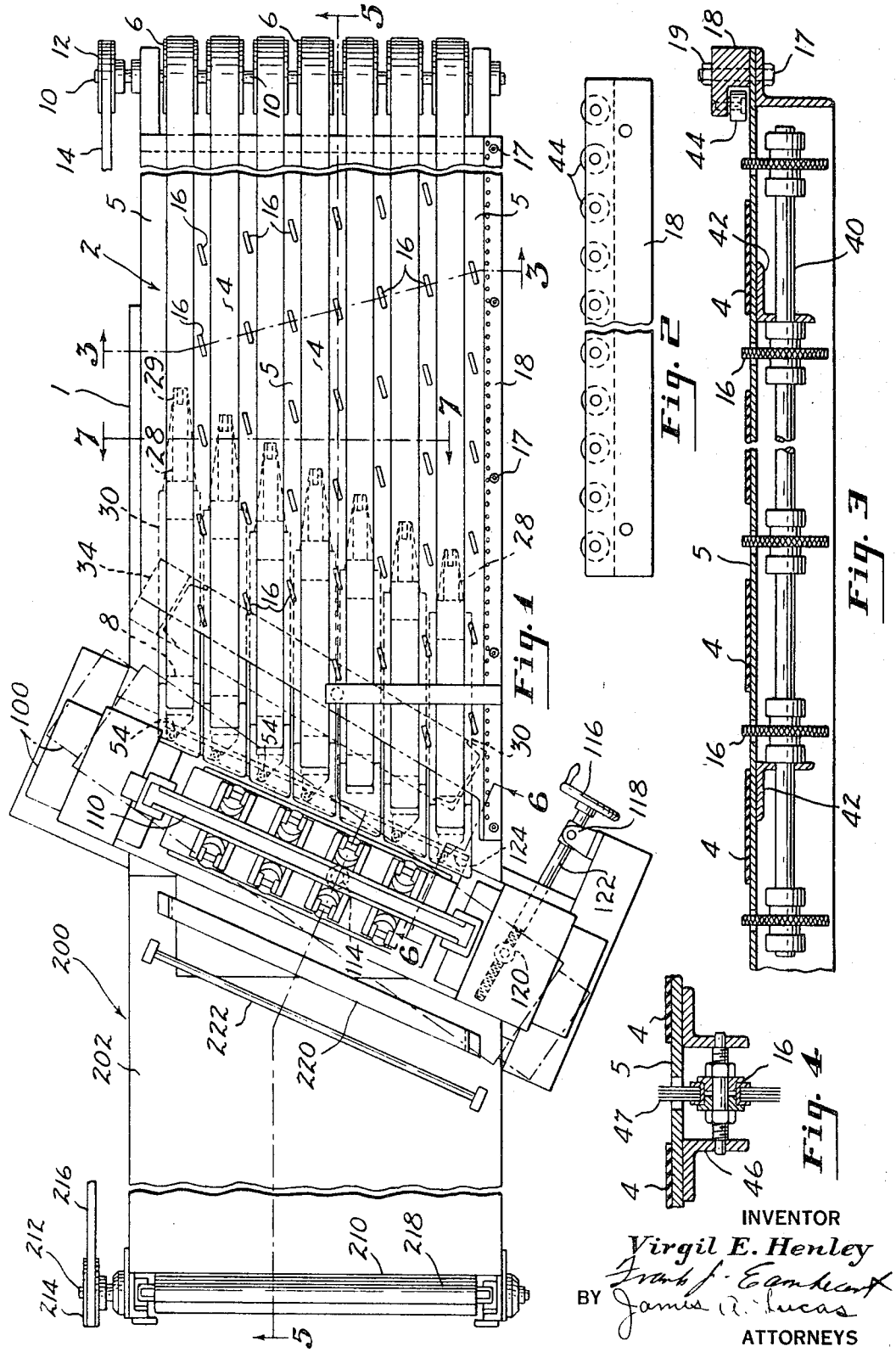
INVENTOR
Virgil E. Henley
BY
ATTORNEYS

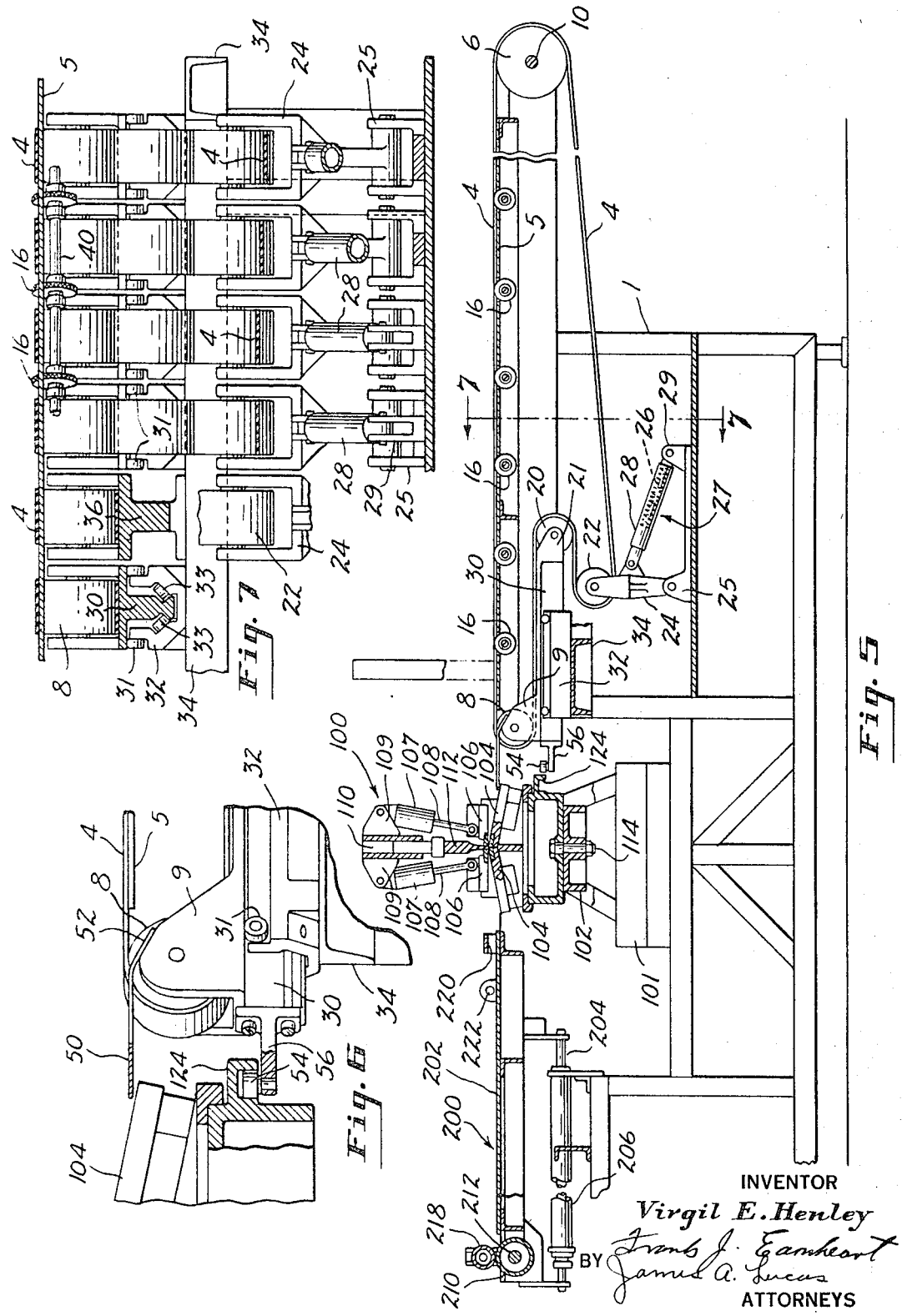

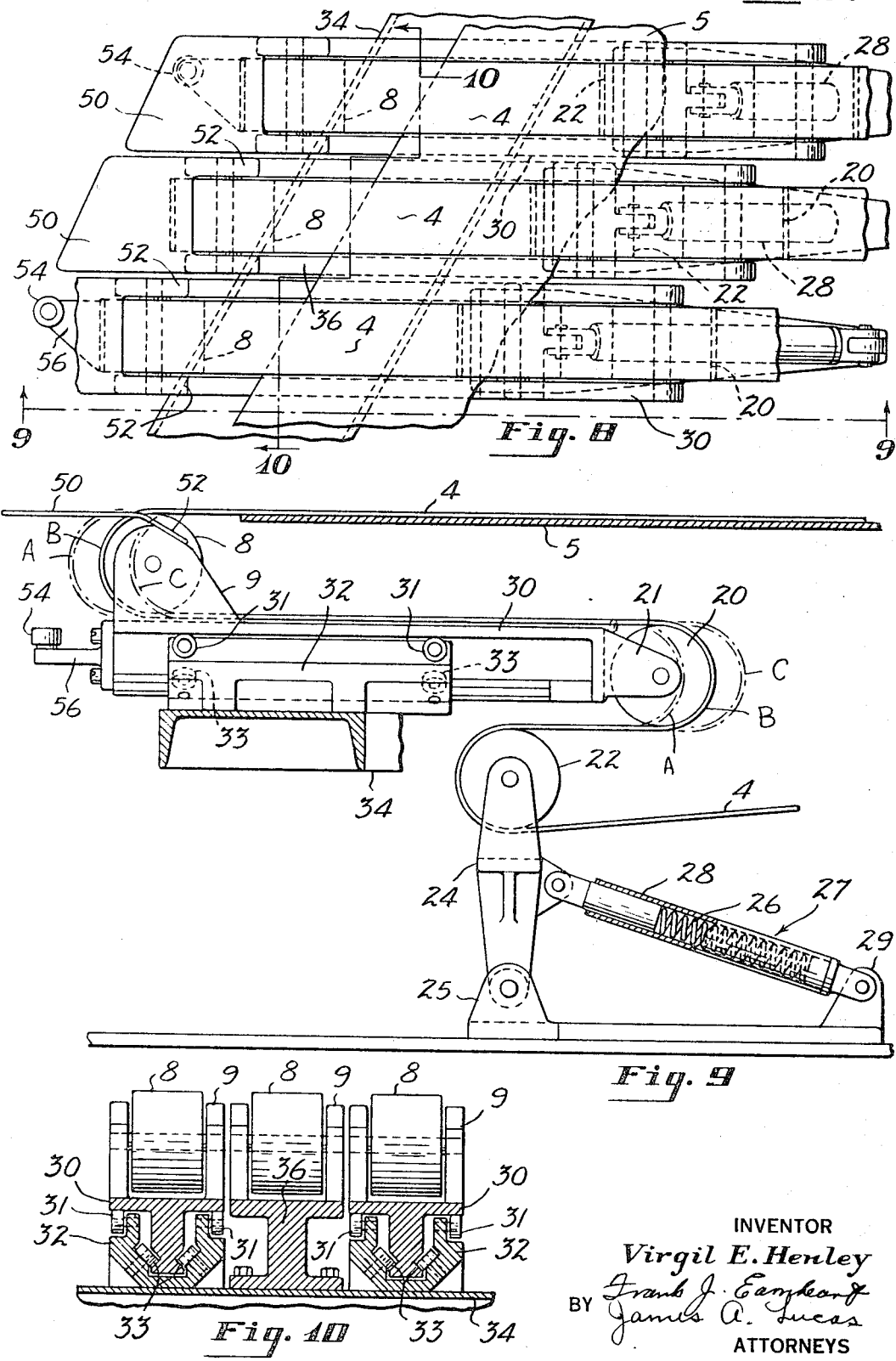

United States Patent Office 3,444,030
Patented May 13, 1969

3,444,030
CONVEYER LENGTH ADJUSTMENT MECHANISM
Virgil E. Henley, Akron, Ohio, assignor to The General Tire Rubber Company, a corporation of Ohio
Continuation-in-part of application Ser. No. 317,556, Oct. 21, 1963. This application May 19, 1966, Ser. No. 551,314
Int. Cl. G03d 15/04
U.S. Cl. 156—507          5 Claims

ABSTRACT OF THE DISCLOSURE

A mechanism is provided for use with a conveyer and which permits ready adjustment of the length of the conveyer. This mechanism includes a pair of length adjustment rollers which are adapted to be moved together in the direction of the conveyer surface, and an additional spring-biased roller adapted to maintain uniform tension on the conveyer belt at all times.

---

This invention relates to a belt conveyer used, for example, to feed material such as tire cord fabric to a butt splicer of the type shown and described in my copending application, S.N. 317,556 filed Oct. 21, 1963, now Patent No. 3,325,328 of which the present application is a continuation-in-part.

In the construction of pneumatic tires, the carcass portion thereof is typically fabricated from a plurality of plies of tire cord fabric. This fabric is made by a calendering operation in which closely-spaced, longitudinally extending, parallel cords of rayon, nylon, or the like are embedded in a layer of a suitable elastomeric material such as natural rubber. Typically, the fabric cords in a tire carcass extend diagonally from bead to bead. Prior to its incorporation into the carcass, the calendered fabric is removed from large rolls and is bias cut into strips. The uncut edges of the strips are then spliced together to form a continuous roll with all of the cords extending in a common diagonal direction.

The above mentioned patent describes a splicer of the type used to butt splice the edges of these transversely cut strips together. This splicer utilizes a plurality of interdigital grippers which hold the contiguous edges of the strips to be spliced and press them together in such a manner as to insure good adhesion at the abutting edges. The two pairs of grippers are pivotally mounted about spaced parallel axes and are adapted to move from an upwardly inclined position, where the edges of the fabric to be joined are spaced apart, down to a horizontal dead-center position, where the fingers of one pair of grippers enter between the fingers of the other pair to press the edges of the sheet material together and cause knitting of the elastomeric material around the fabric.

An important aspect of the above-mentioned invention is the necessity for properly aligning and spacing the edges of the fabric to be spliced. Accordingly, means must be provided to accurately feed bias-cut pieces to the splicer for advancing a spliced strip through the splicer and for repositioning the trailing edge of that strip in the splicer head for the next splicing operation.

This splicer, as well as others which are used throughout the industry for butt or lap splicing tire carcass fabric and the like, are typically provided with means to change the splice angle to correspond precisely with the bias angle at which the fabric is cut. To insure smooth operation of the splicer, it is important that the end of the conveyer adjacent the splicer be as close thereto as possible. The present invention relates to a mechanism for use with a belt conveyor for effecting an angular adjustment of the end of the conveyer at the same time that the angle of the splicer is changed.

Conveyors of this type are typically composed of a plurality of parallel, longitudinally extending flexible belts, each belt passing over at least two rollers, the distance between the rollers defining the active conveyor surface.

It is one object of this invention to provide a belt conveyer which has a degree of operational flexibility which has been heretofore unobtainable in conveyors of previous construction;

Another object of this invention is a belt conveyor for a butt splicer provided with means whereby the take-off angle of the conveyor is automatically adjusted to accommodate for changes in the splicing angle of the butt splicer;

Another object is a belt conveyor comprising one or more continuous belts, some or all of which are provided with means to adjust the length of their conveyor surface while at the same time maintaining uniform tension upon each of said belts.

These and other objects are accomplished in the manner to be hereinafter described in detail, with particular reference being given to the drawings in which:

FIGURE 1 is a top view of an adjustable angle splicing mechanism, a multiple belt feed conveyor, and a take-off conveyor associated therewith.

FIGURE 2 is an enlarged plan view of the fabric guide rail used on the feed conveyor shown in FIGURE 1.

FIGURE 3 is a cross-sectional elevational view, on an enlarged scale, taken along lines 3—3 of FIGURE 1 showing a series of knurled idler rollers.

FIGURE 4 shows a modified form of the idler rollers of FIGURE 3.

FIGURE 5 is an overall elevational view, with parts in cross section, taken along lines 5—5 of FIGURE 1 with certain parts omitted for clarity.

FIGURE 6 is an enlarged cross-sectional view taken along lines 6—6 of FIGURE 1.

FIGURE 7 is an enlarged vertical cross-sectional end view taken along lines 7—7 of FIGURES 1 and 5.

FIGURE 8 is an enlarged fragmentary top view of several belt adjusting devices shown in FIGURE 1.

FIGURE 9 is an elevational view of one of the adjusting devices shown in FIGURE 8 as taken along lines 9—9 theerof, and FIGURE 10 is an elevational view in cross-section taken along lines 10—10 of FIGURE 8.

This invention relates to a conveyer comprising at least one flexible belt passing over first and second axially aligned rollers defining therebetween a conveyer surface. Means are provided for moving at least one of these rollers toward or away from the other to change the length of the conveyer surface of the belt, and additional means are provided for maintaining uniform tension on each belt independently of the length of the conveyer surface.

More particularly, the invention relates to a multiple belt conveyer of the type used to feed sheet material, such as strips of tire cord fabric, to a butt splicer. At least some of the belts are provided with means whereby the distance between the rollers defining the conveyer length of the belts can be adjusted while maintaining uniform tension on each of the belts. Additional means, comprising a plurality of freely rotatable, angled guide rollers, are provided to insure that each sheet of material is fed in a uniform manner to the splicer. Still further, means are provided to automatically adjust the take-off angle of the conveyer to conform to the bias angle of the splicer.

Various details of the over-all apparatus are shown in FIGURES 1 and 5 wherein the feed belts, splicer, and stock take-off assembly are shown. All of this apparatus is generally mounted upon a frame 1 resting upon the floor. On the right-hand side of the frame 1 is a novel stock feed conveyer 2 comprising a plurality of parallel, longitudinally extended belts 4 passing over drive rollers 6, at the receiving end, and idler rollers 8, at the take-off end. The drive rollers are mounted on a drive shaft 10 which is connected through drive pulley 12 and drive belt 14 to suitable motive means such as an electric motor (not shown). A plurality of small guide wheels or rollers 16 are positioned with their axis below the conveyer surface and their peripheries terminating slightly above and between the belt surfaces. These rollers are biased at a slight angle from the direction of movement of the belts so as to continuously urge the stock material into contact with guide rail 18.

Each of the belts, after passing over an idler roller 8, reverses direction and passes over a second roller 20 located beneath the conveyer surface. The belt again reverses direction and passes over a spring loaded tension roller 22 connected to the end of a pivot arm 24 which in turn is resiliently held by coil spring 26 within sleeve 28. The pivot arm and coil spring are securely attached to a portion of the frame 1. The two idler rollers 8, 20 are each attached to a support member 30, and are preferably, but not necessarily, of approximately the same size. Most of the idler roller support members are slidably mounted within a channel 32 securely attached to a channel support 34.

The splicing head 100 is mounted on a suitable base 101 intermediate the ends of the frame and extends across the apparatus at an angle parallel with the direction of the cords in the cut fabric which is to be applied. This head rests upon a pair of beams 102 bolted to the mounting base and comprises a pair of lower jaws 104 and a pair of upper jaws 106. An inflatable bladder (not shown) underneath the lower jaw 104 serves to maintain these pivotally connected jaws in an inclined position. A pair of cylinders 107 and pistons 108 serve to retain the upper jaws in a slightly elevated position. These cylinders are attached to a pair of mounting brackets 109 which are connected to a suitable cross-beam 110 which, in turn, is attached to a positioning bar 112.

The entire splicing head assembly is mounted so as to swivel around a vertical pivot 114. Hand wheel 116 is secured to a shaft 122 which is pivotally mounted within bracket 118 and is threadedly engaged with collar 120, said collar being mounted upon said splicing head. Rotation of the hand wheel causes said collar to move along the threaded shaft 122 thereby turning the splicing head around the pivot 114 to change the angle between the splicing head and the conveyers.

The stock take-off assembly 200 includes a take-off table 202 that is mounted to move toward or away from the splicing head 100. A pair of rods 204, underneath and attached to the table 202, are positioned within tubular guide rods 206 mounted on opposite sides of the table. An air cylinder or other means is provided to move the take-off table 202 toward or away from the splicing head. At the end of the table, opposite the splicer, a pull roller 210 is mounted on an appropriate shaft 212. A pulley 214, attached to the end of the shaft 212, is driven by the belt 216 to advance the spliced fabric stock after each splicing operation. An idler roller 218 is positioned above the pull roller 210 and presses against the same to prevent slippage between the roller 210 and the strip material.

At the other end of the take-off table, adjacent the splicing head, is located a guide strip 220 of metal or other material, spaced slightly above and extending across the table 202 substantially parallel with the splicing head 100. A wrinkler bar 222 is located in close proximately to the guide strip 220. This bar is adapted to provide a certain amount of slack in the portion of the strip material in proximity of the splicing head. In this manner the tension on the strip material at the splicer is uniform along the entire length of the splicer.

At the start of a typical splicing operation, using a splicer of the type claimed in the aforementioned patent application, the splicing jaws are in their inclined elevated position. The spliced strip which had already passed through the open jaws of the splicer is positioned with its trailing edge in engagement with the positioning bar 112. A fresh strip to be spliced is moved on the conveyer belts toward the splicer head until the leading edge of the strip engages the opposite side of said positioning bar. With the two edges against the opposite sides of this positioning bar, the splicing mechanism is actuated to pivot the splicer jaws in a downwardly direction toward the horizontal, thereby bringing the opposing edges of the two strips together. During this pivotal movement the teeth of the opposed upper jaws interengage to cause some of the rubber at the enge of the splice to flow in an alternating direction from one piece of material to the other to effect a unitizing operation and to insure firm adhesion between the edges. Thereafter the upper jaws swing up to their inclined position and the pull roller is driven to pull the spliced strip through the splicer. Concomitantly therewith, the pull-out table is moved away from the splicer, and as soon as the material has been cleared from the splicer, the lower jaws are raised. Thereafter the take-off table is again moved up to the splicer, and the ends of the fabric are butted up against the positioning bar to prepare for the next splice.

Referring again to the feed conveyor, and more particularly to some of the details thereof, reference is made to FIGURES 2, 3, and 4 whch show the details and various modifications of the equipment for positioning the feed stock on the conveyer preparatory to bringing it into contact with the positioning bar of the splicer head. As previously mentioned, a plurality of guide rollers are located in between the various belts of the conveyer, these rollers adapted to rotate about an axis which is angled slightly from the direction of travel of the belts. As shown in FIGURE 3, these rollers are mounted on a shaft 40 locating below the feed table and attached thereto by appropriate means such as brackets 42. The peripheral surfaces of the rollers extend slightly above the top surface of the independent conveyer belts 4 and are contacted and rotated by the stock passing thereover. Because of their angle, these guide rollers impart a slight lateral thrust to the stock thereby urging it into contact with guide rail 18. As shown in FIGURES 2 and 3, the guide rail contains a plurality of horizontally disposed, freely rotatable wheels 44 which provide a low friction guiding surface for the stock. To assist in imparting sufficient lateral thrust to the stock, the periphery of each guide wheel shown in FIGURE 3 is knurled or otherwise roughened. In the modification shown in FIGURE 4, each of the guide wheels is independently suspended between brackets 46 attached to the underside of the table 5, and the peripheral portion 47 of the wheel consists of bristles or the like.

In FIGURES 6 through 10 various other details of the novel belt take-up mechanism are shown, and the same numbers are used throughout for uniformity in designating various parts.

FIGURE 9 shows one of the three take-up mechanisms of FIGURE 8 with various details elaborated more clearly and showing the belt in three alternate positions; A, B, and C. The belt 4, traveling along the conveyer table 5, passes around idler roller 8 suspended between a pair of brackets. It then passes around a second roller 20 held between brackets 21. The belt again reverses direction and passes around tension roller 22 supported at one end of arm 24, the other end of which is pivotally connected to bracket 25. The portion of the belt between idler roller 20 and tension roller 22 is generally parallel to the portion of the belt forming the conveyer surface, this being an important factor in the operation of the belt take-up mechanism. A tensioning mechanism 27, comprising a coil spring 26 within a cylinder 28, has one end thereof securely connected to a pivot block 29 and the other end thereof connected to the pivot arm 24 intermediate the brackets 25 and the tension roller 22. The two pairs of brackets 9, 21 which hold the idler rollers 8, 20 are both secured to a common support 30 which is adapted to ride along rollers 31, 33 in channel 32. Said channel is secured to a structural support member 34 by appropriate means such as welding, etc.

A horizontally disposed spacer shield 50, in substantial alignment with the surface of the conveyer belt, bridges the gap between the idler roller 8 and the jaws of the butt splicer and assists in the transfer of stock thereto. This shield is provided with a pair of downwardly extending, copending legs 52 which straddle the roller 8 and which are welded or otherwise fastened to the brackets 9. Under some circumstances, the shields are not essential and thus may be omitted.

An adjustment knob 54 is attached by arm 56 to the support member 30. As this knob is pushed to the left, support member 30 glides to the left within the channel member 32 thereby moving the idler rollers 8, 20 to position A, shown in outline, thereby effectively increasing the conveyer surface length of the belt. On the other hand, pushing the knob in the opposite direction causes the idler rollers to move to the right, shown in outline as position C, to shorten the length of the belt. Regardless of the position of these two rollers, the spring-actuated tension rollers 22 continue to maintain uniform tension on the belt.

An inverted channel shaped guide 124 extends along the leading edge of the splicer and is adapted to engage the adjustment knobs 54. When the hand wheel 116 is turned to alter the angle of the stitcher head, the guide 124 either pushes or pulls each knob to move the respective support member within its channel and to increase or decrease the effective length of the belt. This movement corresponds, both in direction and magnitude, with the angular movement of the splicer, the length of the movement being proportional to the distance from the splicer head pivot 114. The length of the belt that is located immediately opposite the pivot does not move at all; and therefore, as shown in FIGURE 1, the take-up mechanism for this belt does not have a knob. This is shown with greater clarity in FIGURE 8 where this belt is disposed between a pair of adjustable belts.

FIGURE 10 shows further details of the idler rollers 8 of FIGURE 8 mounted within appropriate brackets 9. The middle roller is connected to an I-beam member 36 which is immovably secured to a structural support member 34 while the two outer rollers are connected to support member 30 adapted to glide within the channels 32. Mounted within each channel 32 are a set of weight-supporting rollers 31 and a set of angularly disposed guide rollers 33. These rollers permit ease of movement of the support member upon the application of pressure to knob 54. During normal operation, the support member remains stationary because the forces created by the belt passing around the two idler rollers 8, 20 equalize one another.

Although this novel conveyer system has been described in connection with its use to feed fabric to a butt splicer, it should be understood that it is likewise applicable to other types of installation. For instance, a multiple belt conveyer of this type can be used wherever it is desired to deliver material to the conveyer or remove it from the conveyer at an angle which is subject to change or variation. Accordingly, this novel conveyer can be used in connection with a cutter of the type used to cut tire fabric at a bias angle prior to feeding the fabric to a butt splicer.

Furthermore, the principle involved in changing the take-off mechanism of the conveyer may be used at the feed end of the conveyer, or can be used at both ends if desired by the use of two sets of movable idler rollers and tensioning rollers.

Furthermore, this invention is applicable to permanent installation wherein it is desired to gain access between one end of the conveyer and the apparatus adjacent thereto for purpose of maintenance or repair. Instead of being arranged to pivot around a fixed conveyer belt, all of the belts can be adjustably moved in the same direction to lengthen or shorten the entire conveyer surface as desired. This can be carried out by hand or can be automated if desired.

The number, width, and size of the conveyer belts are all subject to variation without departing from the novel scope thereof. Furthermore, other changes can be made without departing from the scope of this invention which is delimited by the following claims in which I claim:

1. A conveyer system for transporting sheets of calendered fabric material to a splicer, said splicer adapted to be pivoted about a fixed vertical axis for adjustment of a splicing angle, said conveyer system having a feed end and a let-off end, the latter terminating in proximity to, but at a fixed distance from, said splicer, said system further comprising:
 (a) at least one belt forming the conveyer surface and adapted to sequentially pass around,
  (1) a roller at the feed end of the conveyer system,
  (2) a pair of rollers adapted to be moved in concert, the first of said pair forming the let-off end of the system and the other positioned below the conveyer surface and intermediate the two ends thereof, and
  (3) a belt-tensioning roller; and
 (b) means to adjust the length of said one belt upon angular adjustment of said splicer to maintain said fixed distance between the let-off end of the conveyer system and said splicer, said means comprising a channel and a support member that is common to both of said pair of rollers, said support member positioned within said channels and adapted to move on and be guided by small rollers therein.

2. The system according to claim 1 including means to move said support member within said channel in response to and in the direction of said splicer as the splice angle thereof is changed.

3. The system according to claim 2 wherein this responsive means interconnects the splicer and the support member.

4. A conveyer system for transporting sheets of calendered fabric material to an angularly adjustable splicer, said conveyer system having a feed end and a let-off end terminating in proximity to, but at a fixed distance from, said splicer; said system comprising:
 (a) a plurality of spaced-apart parallel belts forming the conveyer surface, each of said belts adapted to pass around,
  (1) a roller at the feed end of the conveyer system,
  (2) a first idler roller forming the let-off end of the belt and a second idler roller positioned below the conveyer surface, between the ends thereof and spaced a fixed distance from said first idler roller, and
  (3) a belt tensioning roller;
 (b) means to adjust individually the conveyer length of some of the belts to maintain said fixed distance when changes are made in the splicing angle of the splicer, said means comprising a channel and a support member within said channel, said support member adapted to support both of said idler rollers and adapted to be moved toward or away from the roller at the feed end to shorten or lengthen the conveying surface of that belt,
 (c) guide means positioned along one side of said conveyer, parallel with the belts, and (d) a plurality of small guide rollers positioned axially below the conveyer surface and between the belts, with said guide rollers projecting slightly above the surface of said belts, all of said rollers biased at a slight, equal angle to the direction of movement of said conveyer belts to cooperatively urge the sheets of material against said guide means.

5. The system according to claim 4 wherein said channel is provided with a plurality of small guide rollers and a plurality of small weight-carrying rollers for movement of the support within the channel.

References Cited

UNITED STATES PATENTS

| | | | |
|---|---|---|---|
| 3,130,100 | 4/1964 | Hasselquist | 156—157 |
| 2,874,823 | 2/1959 | Zuercher | 198—139 |
| 2,925,900 | 2/1960 | Murphy | 198—139 |
| 2,951,580 | 9/1960 | Slomer | 198—139 |
| 3,099,501 | 7/1963 | Hillson et al. | 308—3.8 |
| 3,100,731 | 8/1963 | Brey | 156—502 |

EARL M. BERGERT, *Primary Examiner.*

W. E. HOAG, *Assistant Examiner.*